United States Patent [19]
Klimisch

[11] 3,855,389
[45] Dec. 17, 1974

[54] METHOD OF TREATING EXHAUST GASES OF INTERNAL COMBUSTION ENGINES

[75] Inventor: Richard L. Klimisch, Troy, Mich.

[73] Assignee: General Motors Corporation, Detroit, Mich.

[22] Filed: Dec. 26, 1972

[21] Appl. No.: 318,680

[52] U.S. Cl............. 423/213.5, 60/301, 252/466 B
[51] Int. Cl............................................. B01d 53/34
[58] Field of Search ........ 423/213.5, 213.7; 23/288; 60/301; 252/466 B

[56] References Cited
UNITED STATES PATENTS

| 3,230,034 | 1/1966 | Stiles | 423/213.2 |
| 3,370,914 | 2/1968 | Gross et al. | 423/213.5 |
| 3,492,098 | 1/1970 | De Palma et al. | 23/288 F |
| 3,513,109 | 5/1970 | Stiles | 423/213.2 |

Primary Examiner—G. O. Peters
Attorney, Agent, or Firm—Sidney Carter

[57] ABSTRACT

Exhaust gases of an internal combustion engine are contacted with a nickel-palladium catalyst to reduce the nitrogen oxides in the exhaust gas stream. The nickel-palladium catalyst has been found to be effective in reducing the nitrogen oxides while minimizing the generation of residual ammonia at temperatures above 650° C.

3 Claims, 3 Drawing Figures

METHOD OF TREATING EXHAUST GASES OF INTERNAL COMBUSTION ENGINES

This invention relates to a catalyst and method of utilizing same for reducing nitrogen oxides and, particularly, to the catalytic reduction of nitrogen oxides contained in exhaust gases from an internal combustion engine to reduce the amount of nitrogen oxide emissions into the atmosphere. More specifically, this invention relates to a catalyst and method of utilizing same which is effective in reducing nitrogen oxides in the exhaust gases from an internal combustion engine while minimizing the generation of residual ammonia.

Automotive exhaust gases contain mainly three undesirable components: unburned or partially oxidized hydrocarbons; nitrogen oxides; primarily nitric oxide; and carbon monoxide. The hydrocarbons come from fuel that is not completely oxidized to carbon dioxide and water during engine operation, while the nitrogen oxides result from the high temperature dissociation of molecular nitrogen and oxygen from the intake air used to burn the fuel, which combine to form the nitrogen oxides. To remove the undesirable componets from automotive exhaust gases, it is necessary to carry out oxidation reactions to remove the carbon monoxide and hydrocarbons and at the same time reduction reactions to remove the nitrogen oxides. One method of accomplishing this result involves a dual catalyst emission control system wherein a reducing exhaust gas stream, i.e., an exhaust gas stream containing less than the stoichiometric amount of air required for combustion, is first fed into contact with a reduction catalyst to reduce the nitrogen oxides after which air is pumped into the exhaust stream to provide an oxidizing exhaust gas stream which is then fed into contact with an oxidation catalyst to remove the hydrocarbons and carbon monoxide. One of the principal problems with such systems is that most reducing catalysts effective in reducing nitric oxide convert most of the nitric oxide to ammonia. This problem is particularly acute in dual catalytic control systems because the ammonia formed in a first or reducing catalyst stage tends to be oxidized back to nitric oxide in the second or oxidation catalyst stage. In effect, then, there is essentially no reduction of nitrogen oxide emissions. Accordingly, it may be seen that such systems require a catalyst effective not only in reducing nitric oxide but also in eliminating the ammonia which is typically formed in the reduction reaction.

It has now been found that the major route from nitric oxide to elemental nitrogen involves the formation of ammonia as an intermediary. That is, in the reduction reaction the nitric oxide reacts with hydrogen to form ammonia and water with the ammonia formed decomposing to elemental nitrogen and hydrogen. Thus, the primary reactions are:

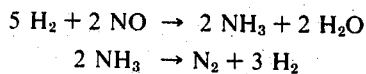

$$5 H_2 + 2 NO \rightarrow 2 NH_3 + 2 H_2O$$

$$2 NH_3 \rightarrow N_2 + 3 H_2$$

Accordingly, an effective automotive emission control reduction catalyst must be able to promote not only the formation of ammonia as an intermediary in the nitric oxide reduction reaction, but also the decomposition of the ammonia formed to effectively eliminate any residual amount of ammonia in the exhaust gas stream exiting the reduction stage of the system.

It has been further found that a catalyst consisting essentially of, by weight, alumina containing about 5 to 25 percent nickel and about 0.03 to 1 percent palladium is effective in promoting both of these reactions at temperatures above about 650° C, whereby the nitric oxides may be effectively reduced while residual ammonia generation is minimized.

The catalyst composed of nickel-palladium and aluminum oxide is prepared by first dissolving a nickel salt, such as hydrated nickel nitrate, in water to form a solution to which is added low-density activated alumina pellets. It is advantageous that the alumina be in the form of spheres having a surface area from 10–300 square meters per gram so that they may be effectively used in a fixed bed catalytic reactor structure. The term "pellet" as used herein, includes such configurations as spheres, cylinders, tablets and the like. The pellets are stirred and soaked in the nickel nitrate solution for several hours until complete penetration by the solution is achieved. After soaking, the pellets are removed from the solution, the excess liquid is drained from the pellets and the pellets are dried in air at room temperature for several hours. The pellets are then calcined by placing them in a furnace at a temperature of about 550° C and passing air over them at a rate of approximately 500 volumes of air per volume of catalyst per hour for about 4 hours. After calcining, the air flow is terminated and the catalyst is cooled to room temperature. A source of palladium, such as palladium chloride, is then dissolved in water to form a solution to which the nickel-containing alumina spheres are added and soaked to achieve penetration by the solution. The pellets are then again dried, calcined at 550° C for about 4 hours and cooled to room temperature to provide the nickel-palladium catalyst. Although a two-step impregnation process has been described, it is to be recognized that either the palladium or the nickel may be applied first, or the two applied simultaneously.

The catalyst prepared by the above-described process can be used in many well known catalytic reactor structures in which catalyst pellets are packed in the reactor which is normally located at a suitable position in the exhaust stream away from the engine such that the exhaust gases are passed into contact with the catalyst without the catalyst being heated to an excessively high temperature which causes deterioration of the catalyst structure. The temperatures of exhaust gases entering the reactor from a normally functioning internal combustion engine are typically within the range of 200°–1,500° F. The catalyst previously described has been found to be effective in converting the nitrogen oxides substantially completely to nitrogen and water at temperatures above 500° F and in minimizing the amount of residual ammonia in the exhaust gases at temperatures above about 1,200° F (about 650° C).

Exhaust gases from internal combustion engines contain CO, $CO_2$, $H_2O$, $N_2$ and $H_2$ together with nitrogen oxides, particularly NO, unburned hydrocarbons and oxygen. In accordance with the principal feature of my invention, the reduction of the nitrogen oxides by hydrogen is effected by the palladium component of the catalyst, while the elemental decomposition of the ammonia formed in this reaction is effected by the nickel component of the catalyst. However, as will hereinafter be demonstrated, the nickel component has a large synergistic effect on the palladium component whereby its nitric oxide reduction activity is greatly improved even though nickel's own activity in promoting the reduction of nitric oxide is poor. Similarly, a slight snyergism exists between the palladium and nickel components whereby the ammonia decomposition activity of the nickel component is increased.

The following specific examples will further serve to illustrate my invention and its effectiveness in reducing nitrogen oxide while minimizing the generation of residual ammonia, reference being had to the accompanying drawings of which:

EXAMPLE I

A catalyst of nickel and palladium and activated alumina was prepared as follows. 195g of Ni(NO$_3$)$_2$·6H$_2$O was dissolved in 750 ml of distilled water. 750 ml (380g) of activated alumina spheres having a surface area of 260 m$^2$/g were stirred into the solution, soaked, removed, air dried and calcined as previously described. The alumina used was a type KC/SAF gell derived alumina sold commercially by Kaiser Aluminum Company in the form of ⅛ inch spheres. The nickel-containing pellets were then impregnated with a solution of 40 ml of 5 percent PdCl$_2$ dissolved in 750 ml of distilled water and again calcined as previously described. The resulting catalyst contained about 0.33 percent palladium and about 9.2 percent nickel, by weight, and had a surface area of about 165 m$^2$/g. 15cc of catalyst was placed in a tubular reactor made from ¾ inch I.D. stainless steel pipe held vertically in an electrically heated furnace. A simulated exhaust gas feed stream was prepared by blending cylinder gases to obtain a gas concentration of 1.0% CO, 0.1% NO, 0.3% H$_2$, 10% H$_2$O, 10% CO$_2$, and balance N$_2$. The feed stream was contacted with the catalyst at a gas space velocity of 38,000 g.h.s.v. The concentration of gas exiting the tubular reactor was continuously monitored.

Figure 1:
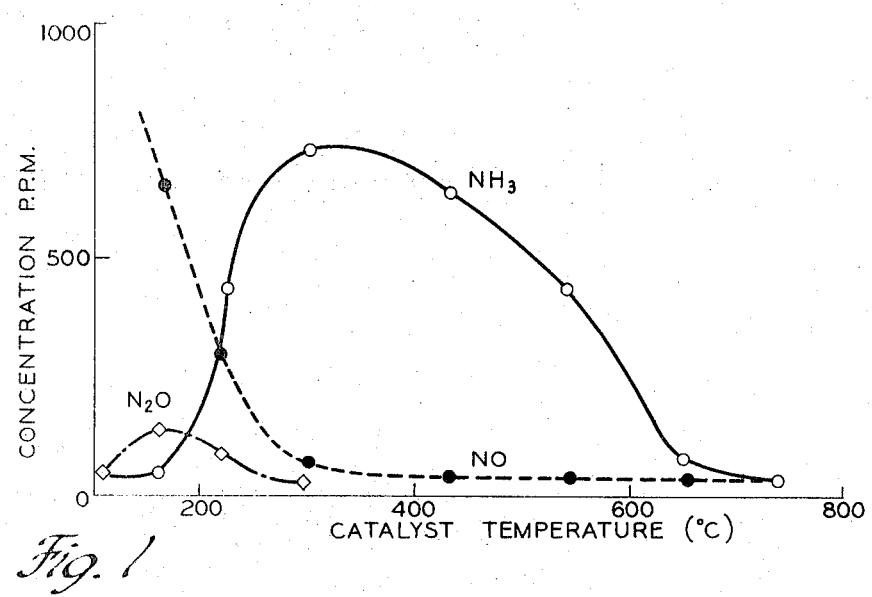
FIG. 1 is a graph showing the NO reduction activity and the generation of residual ammonia and nitrous oxide over the Pd-Ni-Al$_2$O$_3$ catalyst of catalyst of this invention.

The effectiveness of the catalyst in reducing NO and minimizing the generation of residual NH$_3$ is demonstrated by the test results shown in FIG. 1.

Referring to FIG. 1, it will be noted that the catalyst is extremely effective in reducing nitrogen oxides at temperatures above about 200° C. Although the catalytic reaction resulted in considerable generation of residual ammonia in the temperature range between about 200° to 650° C, residual ammonia formation was effectively eliminated at temperatures above 650° C. Accordingly, FIG. 1 demonstrates the ability of the Pd-Ni-Al$_2$O$_3$ catalyst to promote both the formation and decomposition of ammonia, albeit at different temperatures.

The reaction streams were also continuously monitored for nitrogen dioxide (NO$_2$) and for nitrous oxide (N$_2$O). Nitrogen dioxide never appeared in the reduction product stream. The occurrence of nitrous oxide, however, was noted at low temperatures, as FIG. 1 indicates. The N$_2$O concentration, which peaked at 160° C accounting for 25 percent of the inlet NO, coincided with the onset of NO reduction and declined thereafter to very low values at about 300° C.

The test results shown in FIG. 1 are shown below in Table I in terms of percentage of NO reduced, converted to residual NH$_3$ and converted to N$_2$O as a function of temperature.

TABLE I

NO Reduction and Residual NH$_3$ and N$_2$O Generation Over Pd-Ni-Al$_2$O$_3$ Catalyst

| Temperature °F | % NO Converted | % NO to Residual NH$_3$ | % NO to N$_2$O |
|---|---|---|---|
| 200 | 7 | 0 | 5 |
| 320 | 33 | 0 | 25 |
| 425 | 71 | 43 | 17 |
| 575 | 93 | 73 | 2 |
| 600 | 97 | 73 | 0 |
| 800 | 97 | 73 | 0 |
| 1000 | 98 | 53 | 0 |
| 1200 | 98 | 8 | 0 |

EXAMPLE II

The catalyst prepared in Example I was also evaluated for its effectiveness in promoting the reduction of NO in comparison with a 0.3% Pd-Al$_2$O$_3$ catalyst having a surface area of 170 m$^2$/g and a 9.2% Ni-Al$_2$O$_3$ catalyst having a surface area of 177 m$^2$/g. The catalysts were contacted with a synthetic exhaust gas stream containing 1.0% CO, 0.10% NO, 0.3% H$_2$, 10% H$_2$O, 10% CO$_2$ and balance N$_2$ at 38,000 g.h.s.v. The test results are shown in FIG. 2.

Figure 2:
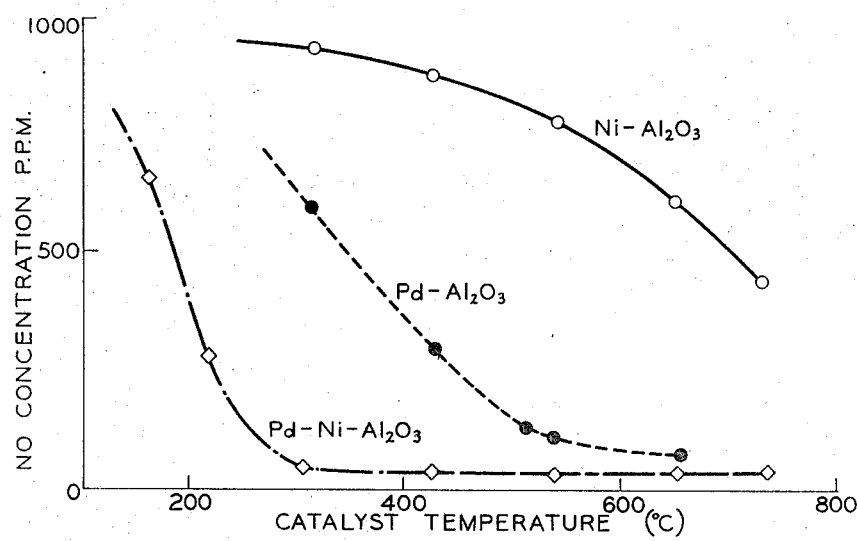
FIG. 2 is a graph comparing the NO reduction activities for the Pd-Ni-Al$_2$O$_3$ catalyst of FIG. 1 with a Pd-Al$_2$O$_3$ and an Ni-Al$_2$O$_3$ catalyst.

As FIG. 2 indicates, the Pd-Al$_2$O$_3$ catalyst has relatively poor activity in promoting the NO reduction reaction while the activity of the Ni-Al$_2$O$_3$ catalyst is still poorer. However, the composite Pd-Ni-Al$_2$O$_3$ catalyst exhibits a large synergism for nitric oxide removal. This effect is quite unexpected since it has been found that the Ni-Al$_2$O$_3$ catalyst is not even as active as Al$_2$O$_3$ alone for nitric oxide removal.

EXAMPLE III

The catalyst prepared in Example I was also evaluated for its effectiveness in promoting the decomposition of ammonia in comparison with the Pd-Al$_2$O$_3$ and Ni-Al$_2$O$_3$ catalyst described in Example II. The catalysts were contacted with a synthetic gas mixture of 0.10% NH$_3$, 10% H$_2$O and balance N$_2$ at 38,000 g.h.s.v. The test results are shown in FIG. 3.

Figure 3:
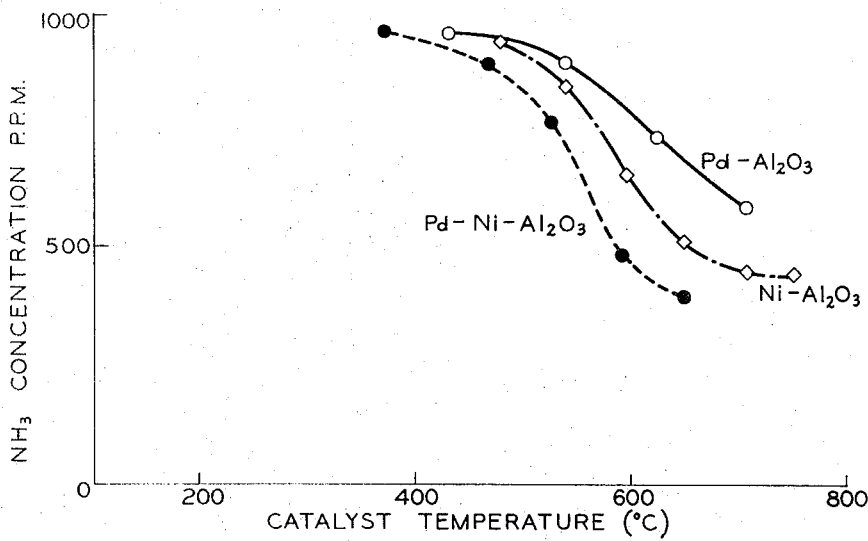
FIG. 3 is a graph comparing the ammonia decomposition activities for the Pd-Ni-Al$_2$O$_3$ catalyst of FIG. 1 with the Pd-Al$_2$O$_3$ and Ni-Al$_2$O$_3$ catalysts of FIG. 2.

As in Example II, FIG. 3 demonstrates the superior NH$_3$ decomposition activity of the Pd-Ni-Al$_2$O$_3$ catalysts and indicates a slight synergism for NH$_3$ decomposition activity paralleling that found in Example II for NO reduction activity.

Although my invention has been described in terms of the use of alumina pellets, it will be recognized by those skilled in the art that the alumina may take a variety of structural forms such as a cellular or filamentary body of desired configuration.

Having thus described my invention, what is claimed is:

1. A method for catalytically reducing nitrogen oxides contained in internal combustion engine exhaust gases while minimizing the formation of residual ammonia comprising, passing said exhaust gases at temperatures above about 650° C into contact with a catalyst consisting essentially of alumina having a surface area from 10 to 300 square meters per gram containing, by weight, about 5 to 25 percent nickel and a small, but catalytically effective amount up to about 1 percent of palladium.

2. The method of claim 1 wherein said catalyst consists essentially of alumina containing, by weight, about 9 percent nickel and 0.3 percent palladium.

3. The method of claim 1 wherein said catalyst consists essentially of alumina having a surface area from 100 to 200 square meters per gram containing, by weight, about 9 percent nickel and 0.3 percent palladium.

* * * * *